(12) United States Patent
Hannewald

(10) Patent No.: US 7,266,891 B2
(45) Date of Patent: Sep. 11, 2007

(54) METHOD FOR SEALING A THROTTLE VALVE HOUSING

(75) Inventor: Thomas Hannewald, Griesheim (DE)

(73) Assignee: Siemens AG, München (DE)

( * ) Notice: Subject to any disclaimer, the term of this patent is extended or adjusted under 35 U.S.C. 154(b) by 337 days.

(21) Appl. No.: 11/062,562

(22) Filed: Feb. 23, 2005

(65) Prior Publication Data

US 2005/0145815 A1    Jul. 7, 2005

Related U.S. Application Data

(63) Continuation of application No. PCT/DE03/02165, filed on Jun. 30, 2003.

(30) Foreign Application Priority Data

Aug. 19, 2002   (DE)  ............................... 102 37 864

(51) Int. Cl.
  *B21D 51/16*   (2006.01)
  *F16K 1/22*    (2006.01)
  *F16K 1/48*    (2006.01)
  *F16K 1/36*    (2006.01)
  *F02D 9/08*    (2006.01)

(52) U.S. Cl. .................. 29/890.12; 123/337; 251/58; 251/305; 251/306; 251/308; 251/357; 251/358

(58) Field of Classification Search ............. 29/890.12, 29/890.124; 123/337; 251/305, 306, 308, 251/357, 358, 58
See application file for complete search history.

(56) References Cited

U.S. PATENT DOCUMENTS

| | | | | |
|---|---|---|---|---|
| 1,591,903 A | * | 7/1926 | White ..................... 251/175 |
| 3,122,353 A | * | 2/1964 | Killian ..................... 251/306 |
| 4,003,394 A | * | 1/1977 | Adams ................... 137/15.06 |
| 4,176,823 A | * | 12/1979 | Gliatas ..................... 251/306 |
| 4,344,396 A | * | 8/1982 | Yamada ..................... 123/337 |
| 4,632,360 A | * | 12/1986 | DeSalve ..................... 251/175 |
| 4,836,163 A | | 6/1989 | Muschalik |
| 4,899,984 A | * | 2/1990 | Strickler et al. ............ 251/306 |
| 5,081,972 A | * | 1/1992 | Daly et al. .................. 123/337 |
| 5,181,492 A | * | 1/1993 | Sausner et al. ............. 123/337 |
| 6,135,418 A | * | 10/2000 | Hatton ....................... 251/306 |

(Continued)

FOREIGN PATENT DOCUMENTS

DE           656748           2/1938

(Continued)

OTHER PUBLICATIONS

Translated Abstract—DE-1800423; Stop plate with readjust able seat packing.

(Continued)

*Primary Examiner*—David P. Bryant
*Assistant Examiner*—Alexander P Taousakis

(57) ABSTRACT

The present invention is a method where a one-piece throttle valve is fastened to a throttle valve shaft in a first step. In another step, at least one elastic compensating element is placed onto the throttle valve. In another step, the elastic compensating element is pressed against the inner wall of the throttle valve housing by an expanding tool. In another step, the elastic compensating element pressed against the inner wall of the throttle valve housing is joined to the throttle valve.

8 Claims, 1 Drawing Sheet

U.S. PATENT DOCUMENTS

2002/0056825 A1* 5/2002 Hartman et al. ....... 251/315.01
2002/0104981 A1 8/2002 Gnage et al.

FOREIGN PATENT DOCUMENTS

| DE | 1052194 | 3/1959 |
| DE | 1800423 | 4/1970 |
| DE | 2445106 | 4/1975 |
| DE | 2802873 | 9/1978 |

OTHER PUBLICATIONS

Translated Abstract—DE-1052194; Throttle plate and method for manufacturing.
Translated Abstract—DE-656748; Turn able plate for hot gasoline passages.
Translated Abstract—DE-2445106; Butterfly throttle valve.
Translated Abstract—DE-2802873; Blind plate for gasoline passages.

* cited by examiner

METHOD FOR SEALING A THROTTLE VALVE HOUSING

CROSS REFERENCE TO RELATED APPLICATIONS

The present application is a continuation of international application PCT/DE2003/002165, filed on Jun. 30, 2003, which designated the United States and was pending at the time of designation; and further claims priority to German patent application 10237864.9, filed Aug. 19, 2002; the both of which are herein incorporated by reference.

BACKGROUND OF THE INVENTION

Methods for sealing throttle valve housings are known. Sealing takes place, in this context, by means of throttle valves which are arranged centrally in the throttle valve housing on a throttle valve shaft. For as low an idling rotational speed as possible, the throttle valve must in this case be capable of closing in a highly leaktight manner, so that adverse leakage air is avoided. In the present-day mechanically or electrically driven throttle valve housings, attempts are made to achieve this by means of very narrow tolerances of the individual components. This requires a relatively high outlay in terms of the manufacture of the throttle valve housing and the throttle valve which has to be lathe-turned with very high precision to these narrow tolerances. In this case, care must be taken to ensure that the throttle valve bears in as leaktight a way as possible against the inner wall of the throttle valve housing, but does not touch the inner wall too firmly, since a jamming of the throttle valve may otherwise occur.

SUMMARY OF THE INVENTION

The object on which the invention is based is, therefore, to provide a method for sealing a throttle valve housing, in which a complicated remachining of the throttle valve housing or of the throttle valve may be dispensed with.

The object on which the invention is based is achieved by means of a method for sealing a throttle valve housing, in which, in a first step, a one-part throttle valve is fastened to the throttle valve shaft, in a second step at least one elastic compensating element is laid on to the throttle valve, in a third step the elastic compensating element is pressed against the inner wall of the throttle valve housing by means of an expanding tool, and, in a fourth step, the elastic compensating element pressed against the inner wall of the throttle valve housing is connected to the throttle valve. The one-part throttle valve may consist, for example, of a circular metal sheet. It may be fastened to the throttle valve shaft, for example, via a riveted connection. In a second step, at least one elastic compensating element is laid on to the throttle valve. In this case, for example, two elastic compensating elements may be used, which have a part-circular configuration and which bear with their ends against the throttle valve shaft. In a second step, the at least one elastic compensating element is laid on to the throttle valve in such a way that a gap of, for example, 0.1 to 0.5 mm remains between said compensating element and the inner wall of the throttle valve housing. The diameter of the throttle valve is likewise selected such that, after the throttle valve is fastened to the throttle valve shaft, a gap of, for example, 0.1 to 0.5 mm remains between the throttle valve and the inner wall of the throttle valve housing. What could be used as expanding tool are commercially available expanding tools which are engaged on the compensating element on the inside and press the latter against the inner wall of the throttle valve housing. In this position, in the fourth step, the connection between the compensating element and the throttle valve takes place. The connection may in this case take place positively or frictionally, depending on the choice of materials for the elastic compensating element and the throttle valve. It was shown, surprisingly, that, according to this method, a sealing of the throttle valve housing can take place in such a way that there is no formation of leakage air during the setting of the idling rotational speed. In this case, it is advantageous that the setting of low tolerance ranges of the throttle valve and of the throttle valve housing may be dispensed with. The throttle valve therefore does not have to be lathe-turned with very high precision, and the throttle valve housing likewise does not have to be remachined in a complicated way on its inner wall.

In a preferred embodiment of the invention, the throttle valve is connected to the throttle valve shaft via at least one screw connection. In this case, it is advantageous to provide two screw connections. The throttle valve can thereby be connected to the throttle valve shaft in a relatively simple way.

According to a further preferred embodiment of the invention, the elastic compensating element is of one-part design and has two opposite perforations, the second step is omitted and the elastic compensating element is pushed with the two opposite perforations on to the throttle valve shaft in a preliminary step before the first step. The positioning of the elastic compensating element is thereby advantageously simplified. The two opposite perforations may in this case be configured in such a way that they project in each case into the bearing bores to the throttle valve shaft. An air seal with respect to the shaft perforation is advantageously achieved as a result. The inside diameter of the opposite perforations thus corresponds approximately to the outside diameter of the throttle valve shaft, while, of course, it must be ensured that the elastic compensating element can still be pushed on to the throttle valve shaft.

According to a further preferred embodiment of the invention, a throttle valve made from metal and an elastic compensating element made from a plastic are used. The expanding operation can thereby be carried out in a particularly advantageous way.

According to a further embodiment of the invention, the elastic compensating element pressed against the inner wall of the throttle valve housing is connected to the throttle valve by adhesive bonding, the adhesive being applied to the throttle valve or to the at least one elastic compensating element in a preliminary step or in the second step before the at least one elastic compensating element is laid in place. What may in this case be used as an adhesive is, for example, a two-component adhesive on a methacrylate base (for example, from Pattex: Stabilitexpress). The fastening of the at least one elastic compensating element to the throttle valve can thereby take place in a particularly simple way, while an arrangement of further fastening elements, such as, for example, rivets, may be dispensed with.

According to a further preferred embodiment of the invention, a throttle valve made from plastic and an elastic compensating element made from plastic are used. A connection of the throttle valve to the elastic compensating element, for example by adhesive bonding, is thereby advantageously facilitated.

According to a further embodiment of the invention, polyamide-6 is used as plastics. Polyamide-6 is particularly resistant, precisely under conditions, such as are to be noted in the throttle valve housing during operation.

In a further preferred embodiment of the invention, the connection of the elastic compensating element to the throttle valve takes place by lasing. A particularly stable connection between the throttle valve and the elastic compensating element can thereby be achieved, which remains stable for lengthy operating periods.

According to a further preferred embodiment of the invention, a throttle valve and at least one elastic compensating element made from aluminum are used. The elastic compensating element in this case is in the form of a thin metal strip. It is advantageous, at the same time, that a connection of the throttle valve to the at least one elastic compensating element can be made by spot welding.

BRIEF DESCRIPTION OF THE SEVERAL VIEWS OF THE DRAWINGS

The invention is explained below in more detail and by way of example with reference to the drawing (FIG. 1, FIG. 2).

DETAILED DESCRIPTION OF THE INVENTION

Figure 1:
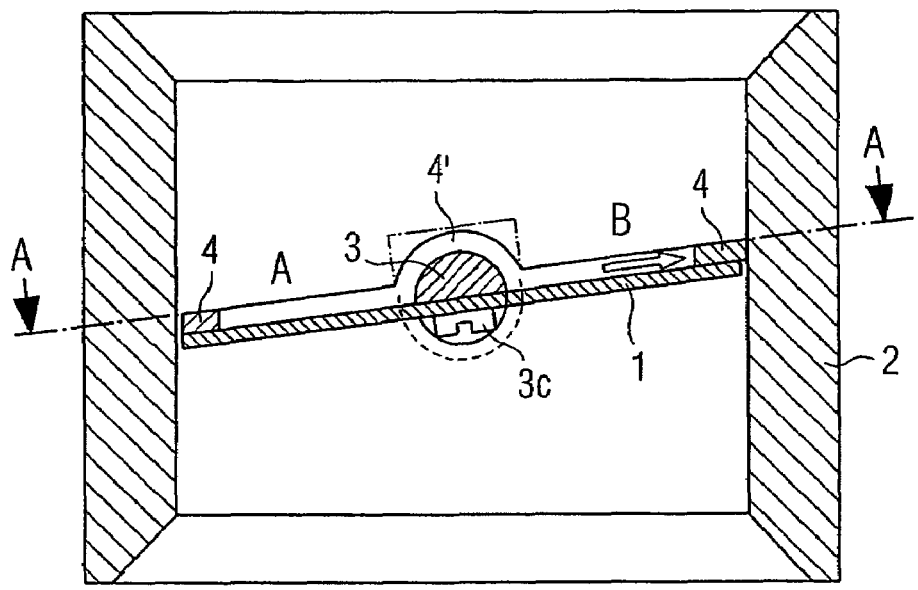
FIG. 1 shows a throttle valve housing in cross section with the throttle valve and with an elastic compensating element.

FIG. 1 illustrates the throttle valve housing 2 in cross section. The half illustration A shows in this case the state in which the elastic compensating element 4 is still at some distance from the throttle valve housing 2. In the half illustration B, the elastic compensating element 4 bears directly against the inner wall of the throttle valve housing 2. In the method for sealing the throttle valve housing 2, in a first step a one-part throttle valve 1 is fastened to a throttle valve shaft 3. This takes place with the aid of a screw 3c. In a second step, at least one elastic compensating element 4 is laid on to the throttle valve 1. This state is shown in the half illustration A. In so far as the connection between the elastic compensating element and the throttle valve is to be made with the aid of an adhesive, care must be taken, before the elastic compensating element 4 is laid on to the throttle valve 1, to ensure that either the elastic compensating element 4 or the throttle valve 1 is provided with the adhesive. In a third step, the elastic compensating element 4 is pressed in the direction of the arrow against the inner wall of the throttle valve housing 2 by means of an expanding tool (not illustrated). This is shown in the half illustration B. Thereafter, in a fourth step, the elastic compensating element 4 pressed against the inner wall of the throttle valve housing 2 is connected to the throttle valve 1. If this connection is to take place by means of an adhesive, it may be advantageous to introduce a ram (not illustrated) into the throttle valve housing 2 and thus press the at least one elastic compensating element 4 against the throttle valve 1. Depending on the choice of material, however, it may also be advantageous to make this connection by lasing or positively, for example by the arrangement of rivets. The elastic compensating element 4 illustrated has two opposite perforations 4' which have a semicircular or circular configuration and the inside diameter of which corresponds approximately to the outside diameter of the throttle valve shaft 3. When such an elastic compensating element 4 is used, the second step of the method is omitted and the elastic compensating element 4 is pushed with the two opposite perforations 4' on to the throttle valve shaft 3 in a preliminary step before the first step. The first step, in which the one-part throttle valve 1 is fastened to the throttle valve shaft 3, takes place subsequently.

Figure 2:
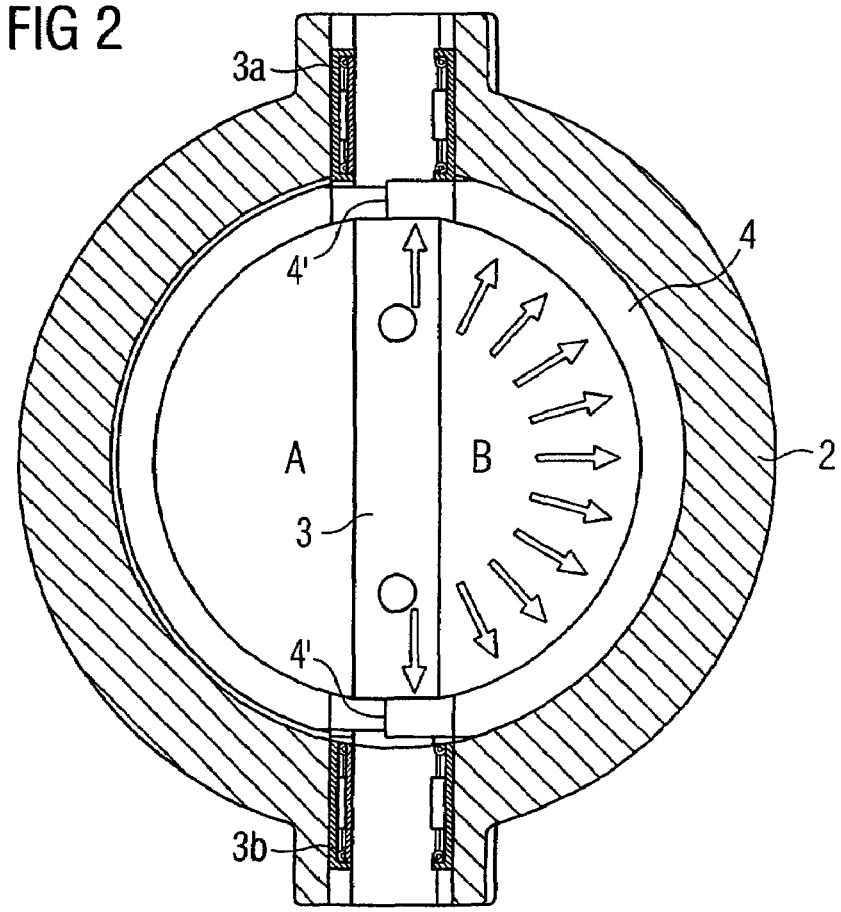
FIG. 2 shows the throttle valve housing in cross section according to the section A-A in FIG. 1.

FIG. 2 illustrates the throttle valve housing 2 in cross section according to the section A-A in FIG. 1. The throttle valve shaft 3 is mounted in two bearings 3a, 3b. The elastic compensating element 4 has two opposite perforations 4' which surround the throttle valve shaft 3. They may also project into the bearing bores of the bearings 3a, 3b, with the result that an air seal with respect to the shaft perforation can be achieved in an advantageous way.

The invention claimed is:

1. A method for sealing a throttle valve housing, comprising the steps of:
   fastening a one-part throttle valve to a throttle valve shaft,
   laying on the throttle valve at least one elastic compensating element,
   pressing the elastic compensating element against an inner wall of the throttle valve housing by means of an expanding tool, and
   connecting the elastic compensating element pressed against the inner wall of the throttle valve housing to the throttle valve.

2. The method according to claim 1, wherein the throttle valve is connected to the throttle valve shaft via at least one screw connection.

3. The method according to claim 1, wherein the throttle valve is made from metal and the elastic compensating element is made from a plastic.

4. The method according to claim 3, wherein the elastic compensating element pressed against the inner wall of the throttle valve housing and is connected to the throttle valve by adhesive bonding, and further comprising the step of applying the adhesive to the throttle valve or to at least one elastic compensating element before the step of laying on the throttle valve.

5. The method according to claim 1, wherein the throttle valve is made from plastic and the elastic compensating element is made from plastic.

6. The method according to claim 5, wherein the plastic comprises polyamide-6.

7. The method according to claim 1, further comprising the step of lasing a connection of the elastic compensating element to the throttle valve.

8. The method according to claim 1, wherein the throttle valve and at least one elastic compensating element comprises aluminum.

* * * * *